United States Patent
Koonen

(10) Patent No.: US 6,681,083 B1
(45) Date of Patent: Jan. 20, 2004

(54) POWER SPLITTER FOR OPTICAL NETWORKS

(75) Inventor: Antonius Marcellus Jozef Koonen, Eemnes (NL)

(73) Assignee: Lucent Technologies Inc., Murray Hill, NJ (US)

( * ) Notice: Subject to any disclaimer, the term of this patent is extended or adjusted under 35 U.S.C. 154(b) by 585 days.

(21) Appl. No.: 09/665,360

(22) Filed: Sep. 19, 2000

(30) Foreign Application Priority Data

Sep. 22, 1999 (EP) .............................. 99307501

(51) Int. Cl.[7] .............................. H04B 10/00
(52) U.S. Cl. .................. 398/171; 398/168; 398/165
(58) Field of Search ................ 398/165, 166, 398/167, 167.5, 168, 171

(56) References Cited

U.S. PATENT DOCUMENTS

| | | | | |
|---|---|---|---|---|
| 4,783,851 A | | 11/1988 | Inou et al. ................... 455/612 |
| 4,814,775 A | * | 3/1989 | Raab et al. .................. 342/373 |
| 4,916,460 A | | 4/1990 | Powell ....................... 343/853 |
| 5,576,875 A | * | 11/1996 | Chawki et al. ................ 398/72 |
| 5,912,749 A | * | 6/1999 | Harstead et al. .............. 398/75 |
| 5,920,410 A | * | 7/1999 | Smith et al. .................. 398/59 |
| 6,525,852 B1 | * | 2/2003 | Egnell ......................... 398/83 |

FOREIGN PATENT DOCUMENTS

| EP | 87301166.2 | 2/1987 | ............ H04B/9/00 |
| FR | 2 756 442 A1 | 5/1998 | ............ H04L/12/42 |

OTHER PUBLICATIONS

European Search Report, dated Feb. 24, 2000.

\* cited by examiner

Primary Examiner—Jason Chan
Assistant Examiner—Dzung Tran
(74) Attorney, Agent, or Firm—D. A. Sarup; G. J. Murgia

(57) ABSTRACT

There is disclosed a network architecture comprising a first set of N serially connected power splitting centers connected at one end to receive a power signal and at another end to a termination point, each splitting center having an output associated with a sub-network for delivering a portion of the power signal to that sub-network, wherein the power splitting factor in each power splitting center is variable such that the portion of the power signal delivered to each sub-network is variable. The invention is described with particular relation to a double fiber ring optical network.

14 Claims, 5 Drawing Sheets

POWER SPLITTER FOR OPTICAL NETWORKS

CROSS-REFERENCE TO RELATED APPLICATION

This application claims priority of European Patent Application No. 99307501.9, which was filed on Sep. 22, 1999.

1. Field of the Invention

The present invention relates to power splitters in serially connected arrangements, and particularly but not exclusively to optical power splitters in a double-fibre ring architecture, e.g. for network protection.

2. Background of the Invention

In an access network deploying a common feeder link for a large number of subscribers, like the amplified passive optical network (PON) architecture such as adopted by the PRISMA project (Photonic Routing of Interactive Services for Mobile Applications), route protection for the most failure-prone parts of the network is desirable. In some situations route protection may be essential to guarantee a sufficiently high level of system availability.

In networks installed in an urban environment, cable cuts are a major cause of system outage. Assuming that the probability of a cable cut is proportional to the cable's length, the most effective measure to improve the system's availability is to provide route redundancy in the longest cable sections of the network. Two parallel routes may be installed in such a section, with a 1×2 optical protection switch that is flipped in case of a cable cut. The probability of system failure due to cable cut without such protection is equal to $p \cdot L_1$ (where p is the cable cut probability per unit length, and $L_1$ is the length of the cable), whereas it reduces to $(p \cdot L_1)^2$ using the protection scheme.

In field-installed networks, it is common practice to provide route redundancy by a double-ring network topology, where in normal operating conditions the signals are transported clockwise from an OLT (Optical Line Termination) to the ONUs (Optical Network Units) along one ring via the links between the nodes, and vice-versa along the same paths. In case of a link failure, the signals are transported both clockwise along one ring and counter-clockwise along the other ring (from OLT to ONUs, and vice-versa along the same paths in each ring), in order to reach the otherwise disconnected nodes. Both rings may be laid out as a linear bus network, the two fibres sharing the same cable sheet, or the same duct. The protection switch is set in a position to deliver all the power in the clockwise direction in normal operation. In the event of link failure (such as a cable cut across both fibres), it is set in a power-split position. From each node, the signals are fed to subsequent power splitting and wavelength-routing stages as, for example discussed in PRISMA's system architecture.

In such network architectures, no accurate control is provided over the power of the optical signal delivered by each node. Any attempt to control such power distribution is further complicated by the variations in the number of nodes in any particular network caused by nodes being removed (due to a connection failure for example) or added.

SUMMARY OF THE INVENTION

According to the principles of the invention, an improved technique is provided for distributing the power of a signal in an arrangement in which a power signal is delivered to a plurality of nodes arranged in a serial manner. In one illustrative embodiment, there is provided a network architecture comprising a first set of N serially connected power splitting centres connected at one end to receive a power signal and at another end to a termination point, each splitting centre having an output associated with a sub-network for delivering a portion of the power signal to that sub-network, wherein the power splitting factor in each power splitting centre is variable such that the portion of the power signal delivered to each sub-network is variable.

The power splitting factor in each power splitting centre may be such that the portion of the power signal delivered to each sub-network is identical. The power splitting factor in each power splitting centre may follow the recursive relation:

$$p_{i-1} = 1 - \frac{1}{1 + a_{i-1} \cdot p_i} \text{ for } i = 2, 3, \ldots, N$$

where $p_{i-1}$ is the power splitting factor in the i-1$^{th}$ power splitting centre, and $a_{i-1}$ is the attenuation loss between the i$^{th}$ and the i-1$^{th}$ power splitting centres, and $p_N=1$ (as this is the last node in the series).

The network architecture may include a second set of N serially connected power splitting centres connected at one end to receive the power signal and at another end to a termination point, each of the second set of optical splitting centres being associated with one of the first set of optical splitting centres such that the nth power splitting centre of the first set is associated with the (N−n+1)$^{th}$ of the second set, and such that each pair of power splitting centres have a respective output connected to a common sub-network; wherein only one of each pair of power splitting centres receives the power signal.

The power splitting factor in each power splitting centre of the second set may be such that the portion of the power signal delivered to each sub-network is identical.

The power splitting factor in each power splitting centre of the second set may follow the recursive relation:

$$q_{i-1} = 1 - \frac{1}{1 + a_{i-1} \cdot q_i} \text{ for } i = 2, 3, \ldots, N$$

where $q_{i-1}$ is the power splitting factor in the i-1$^{th}$ power splitting centre of the second set, and $a_{i-1}$ is the attenuation loss between the i$^{th}$ and the i-1$^{th}$ power splitting centres of the second set; $q_N=1$.

The network may further comprise a central power splitting centre for delivering the power signal to the first and second sets of power slitting centres, the central power splitting centre having an input for receiving the power signal, a first output for delivering the power signal to the first set, and a second output for delivering the power signal to the second set, wherein the central power splitting centre has a variable power splitting factor.

In normal operation the variable power splitting factor in the central power splitting centre may be set such that the power signal is all delivered to the first output.

In the event of a failure in the serial link of the first set of power splitting centres, the variable power splitting factor in the central power splitting centre may be set such that a portion of the power signal is delivered to both the first and second outputs.

If the serial connection is lost between the kth and k+1th power splitting centres of the first set, the first k of the power splitting centres of the first set may receive a portion of the power signal, and the first N−k of the power splitting centres of the second set may receive a portion of the power splitting centre. The power splitting factor in the central power splitting centre may be $$\frac{q_1}{p_1 + q_1},$$

where $p_1$ is the power splitting factor in the first power splitting centre of the first set, and $q_1$ is the power splitting factor in the first power splitting centre of the second set.

The power splitting factor in each active power splitting centre of the first and second sets may be set such that the power level delivered to each sub-network is the same.

Each power splitting centre may be an optical power splitting centre. The network may comprise a passive optical network.

The network may comprise a feeder network for any one of a wireless communication system, a system deploying coaxial cables, a system deploying twisted copper pair cables, etc.

The network architecture may comprise a double fibre ring architecture, the first set of power splitting centres comprising a first fibre ring and the second set of power splitting centres providing a second fibre ring.

The double ring protection architecture using a single-fibre bus topology per ring is a fibre-lean network architecture. In order to obtain a constant output power per node and thus to allow a modular ONU design, the power split factor per node is dependent on the node's position. Deploying a power splitter with a widely tunable split factor according to the present invention will facilitate the insertion of new nodes, and hence enable scalability of the network.

BRIEF DESCRIPTION OF THE DRAWINGS

The invention will now be described by way of reference to the accompanying drawings, in which.

DESCRIPTION OF THE PREFERRED EMBODIMENT

Figure 1:
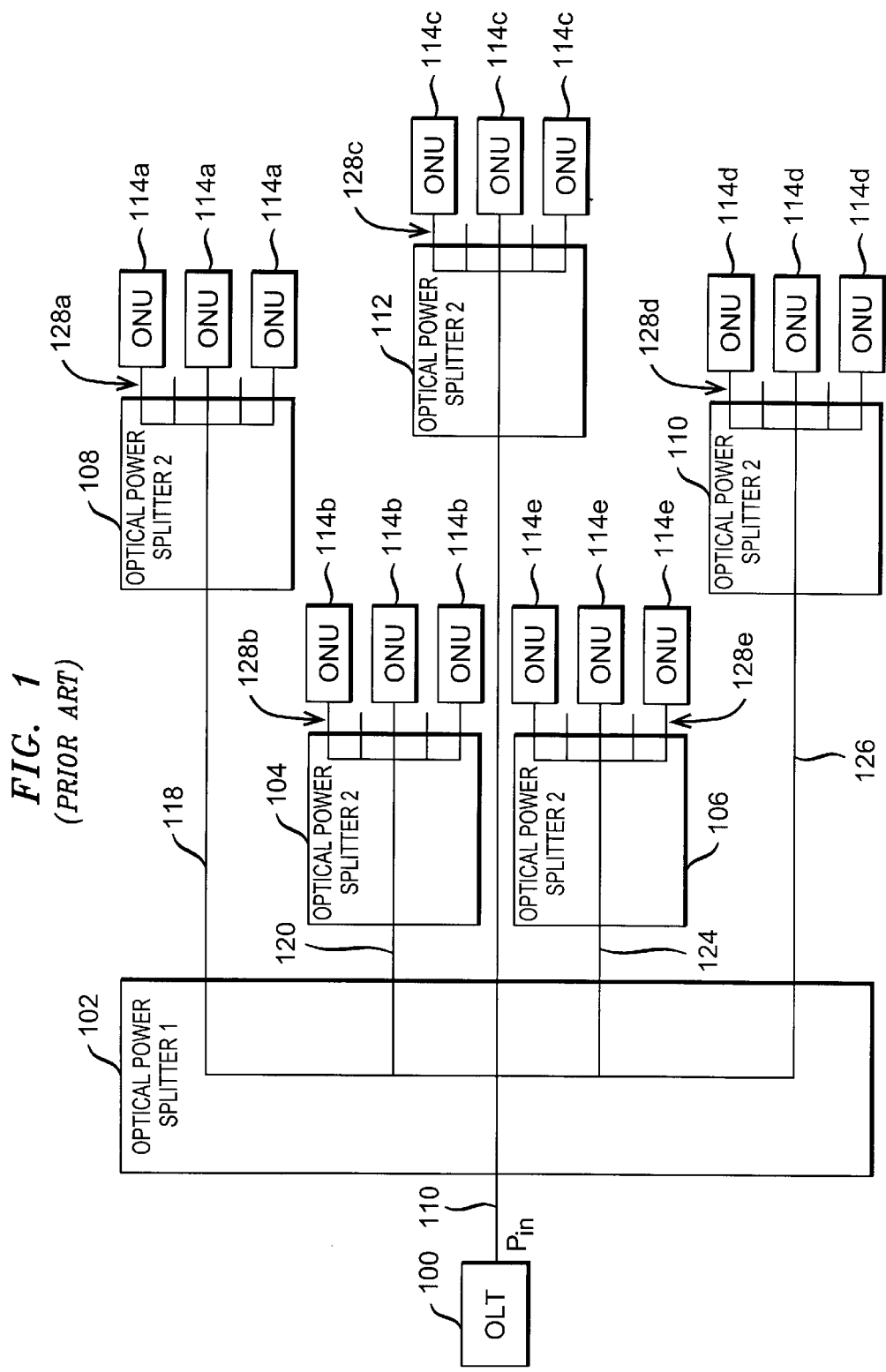
FIG. 1 illustrates a typical hierarchical structure for optical power splitting.

The invention will be described herein with reference to a non-limiting, preferable implementation. In the following description, the invention will be described by way of reference to an implementation of a protection scheme for a Passive Optical Network (PON). Such a PON usually has a tree-and-branch architecture, and for large split factors it may have several optical power splitting stages in cascade. An example PON architecture is illustrated in FIG. 1.

An Optical Line Terminal (OLT) 100 generates an optical signal having a power level Pin on an optical connection 110, which is connected to a first layer optical power splitting centre 102. The optical power splitting centre splits the power of the signal on line 102 such that a portion of the power is delivered on each of its output lines 118, 120, 122, 124 and 126 to a respective one of a second layer of optical power splitting centres 108, 104, 112, 106, and 110. The second layer optical power splitting centres split the power of the respective input signal further amongst a plurality of optical lines 128 connected to a plurality of optical network units (ONUs) 114. For example, the second layer optical power splitting centre 108 distributes a portion of the optical power of the signal on line 118 to each of the three optical network units 114a via the three optical connections 128a.

The network architecture of FIG. 1 is presented as an example structure only. A network may have more optical power splitting layers. The network architecture such as shown in FIG. 1 may, for example, implement the feeder structure of a wireless communication system. The OLT may be associated with a base station controller of the system, and each ONU associated with a base transceiver station. In such arrangement signals are distributed, in addition, in a direction from the ONUs 114 to the OLT 100.

A problem associated with the architecture of FIG. 1 is that in case of a link failure (for example a fibre break) there is no backup to secure the communication from the Optical Line Terminal (OLTs) 100 to the Optical Network Units (ONUs) 114.

In the first network level, i.e. the line from the OLT 100 to the second splitting stages, Such a backup can be provided by a double fibre ring with power taps along both fibre rings. An example of such a double fibre ring architecture is described with reference to FIG. 2.

The OLT 100 is still connected to generate an optical signal having a power level of Pin on line 110. This signal is connected to a main optical power splitting centre 250, which splits the power on its input on line 110 between two outputs on lines 252 and 254. The manner in which the main optical splitting centre 250 delivers the power to the optical connections 252 and 254 will be described further hereinbelow.

A first set of optical power splitting centres 202, 208, 214, 220, 228, 234, and 240 are connected in series between the optical connection 252 and a termination point 258 to form a 'clockwise ring'. The first optical power splitting centre 202 in the serial connection receives as an input the signal on line 252. Each of the other of the first set of optical power splitting centres receives as an input a first output of the previous optical power splitting centre in the serial connection. The last optical power splitting centre 240 has its first output connected to the termination point 258. Each of the optical power splitting centres has a second output connected to an optical connection for delivering a portion of the optical power of the signal on line 252 to a sub-network connected thereto.

Thus, for example, the optical power splitting centre 220 has a second output connected to deliver power on signal line 268 to a further optical power splitting centre 260. The optical power splitting centre 260 delivers a portion of the optical power of the signal on line 268 to each of a plurality of ONUs 266a via signal lines 264a. Similarly, the optical power splitting centre 228 has a second output connected to deliver power on signal line 272 to a further optical power splitting centre 262. The optical power splitting centre 262 delivers a portion of the optical power of the signal on line 272 to each of a plurality of ONUs 266b via signal lines 264b.

A second set of optical power splitting centres 238, 232, 226, 222, 216, 210, and 204 are connected in series between the optical connection 254 and a termination point 256. The first optical power splitting centre 238 in the serial connection receives as an input the signal on line 254. Each of the other of the second set of optical power splitting centres receives as an input a first output of the previous optical power splitting centre in the serial connection. The last optical power splitting centre 204 has its first output connected to the termination point 256.

Each of the second set of optical power splitting centres, as with the first set, has a second output connected to an optical connection for delivering a portion of the optical power of the signal on line 254 to a sub-network connected thereto.

Each one of the second set of optical power splitting centres is associated with one of the first set of optical power splitting centres to from a pair, and the number of power splitting centres in the first and second set is identical. Thus the centres 202 and 204 define a pair 206, the centres 208 and 210 define a pair 212, the centres 214 and 216 define a pair 218, the centres 220 and 222 define a pair 224, the centres 226 and 228 define a pair 230, the centres 232 and 234 define a pair 236, the centres 238 and 240 define a pair 242.

In the general case where there are N power splitting centres in each set, the nth power splitting centre in the first set (where n=1 ... N) is associated with the $(N-n+1)^{th}$ power splitting centre in the second set. Thus, in the example of FIG. 2 where N=7, the $3^{rd}$ power splitting centre in the first set, centre 214, is associated with the $5^{th}$ power splitting centre in the second set, centre 216.

The association of each of the power splitting centres in the first and second sets is such that each pair is associated with the same sub network, which may therefore be referred to as a common sub-network for that pair.

Thus, for example, the optical splitting centre 222 of the second set is paired with the optical splitting centre 220 of the first set, and has a second output connected to deliver power on signal line 270 to the further optical splitting centre 260. The optical splitting centre 260 delivers a portion of the optical power of the signal on line 270 to each of the plurality of ONUs 266a via signal lines 264a. Similarly, the optical splitting centre 226 of the second set is paired with the optical splitting centre 228 of the first set, and has a second output connected to deliver power on signal line 274 to the further optical splitting centre 262. The optical splitting centre 262 delivers a portion of the optical power of the signal on line 272 to each of the plurality of ONUs 266b via signal lines 264b.

Figure 2:
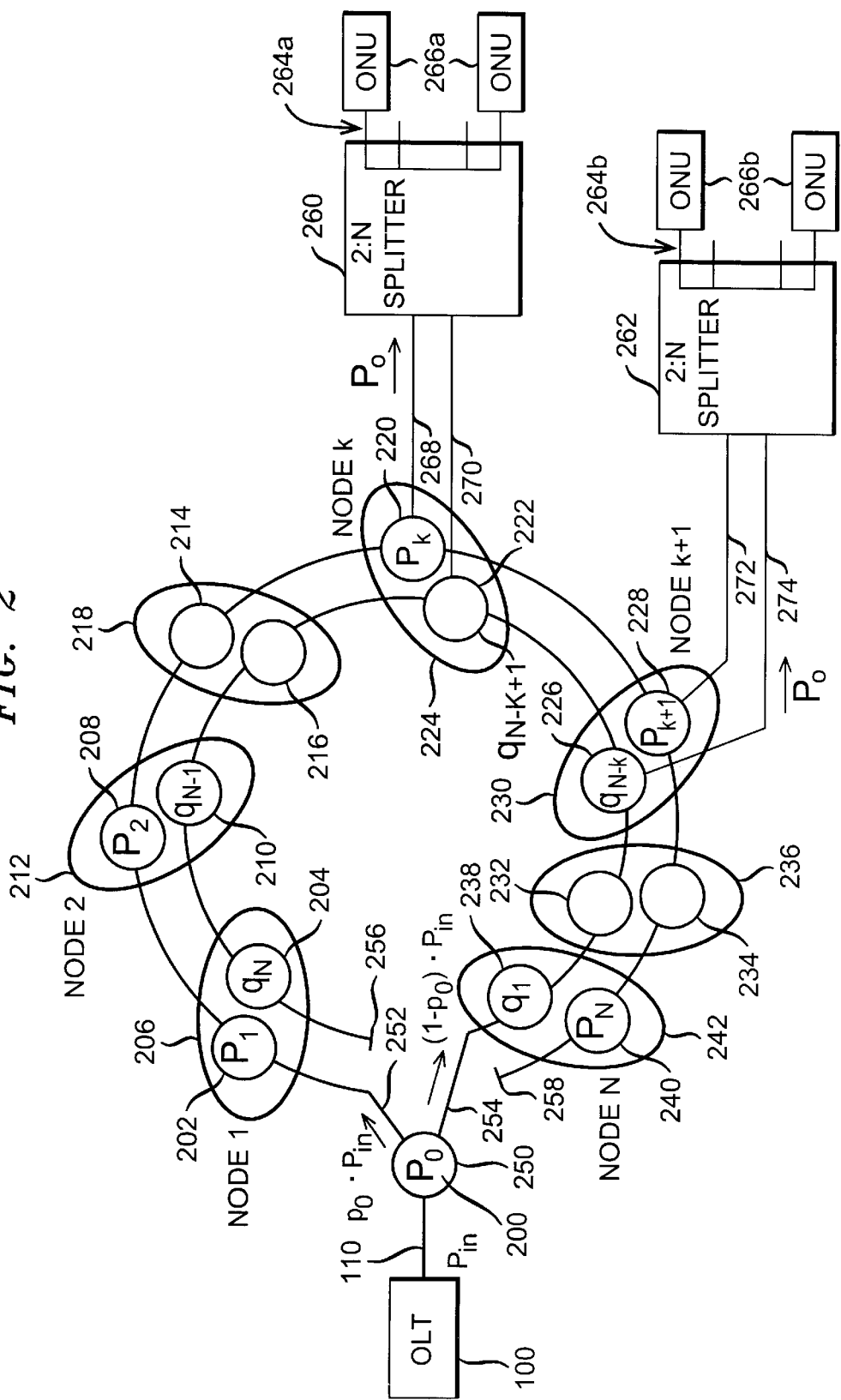
FIG. 2 illustrates a double fibre ring architecture in which the principles of the invention may be applied.

As will be discussed further hereinbelow, the double fibre ring architecture of FIG. 2 is controlled such that only one of the optical power splitting centres of a pair receives a portion of a power signal for distribution to the respective common sub network.

In normal operation, where no faults in the network connections occur, all of the optical power on signal line 110 is delivered to signal line 252, and the first set of optical power splitting centres exclusively deliver power to their respective sub-networks. The second set of optical power splitting centres are thus redundant.

In the event of a failure in the serial connection lines of the first set of optical power splitting centres, the second set are brought into operation. In FIG. 2, it is assumed that a break in the connection occurs between $4^{th}$ optical power splitting centre 220 of the first set, and the $5^{th}$ 228. Thus the power signal on line 252 can no longer be delivered to the optical power splitting centres 228, 234 and 242.

In such a scenario the power signal on line 110 is delivered by the main optical power splitting centre 250 to both the line 252 and the line 254. The sub-networks associated with the optical power splitter pairs 206, 212, 218, and 224 are then served by the first set of optical power splitting centres 202, 208, 214, and 220. The sub-networks associated with the optical power splitter pairs 242, 236 and 230 are then served by the second set of optical power splitting centres 238, 232, and 226.

The present invention may be particularly advantageously applied in the network architecture of FIG. 2, but its application is more general. The general principle of the present invention will first be described by way of reference to the example shown in FIG. 3, and then its more specific applicability in the double ring fibre architecture of FIG. 2 will be discussed.

Figure 3:
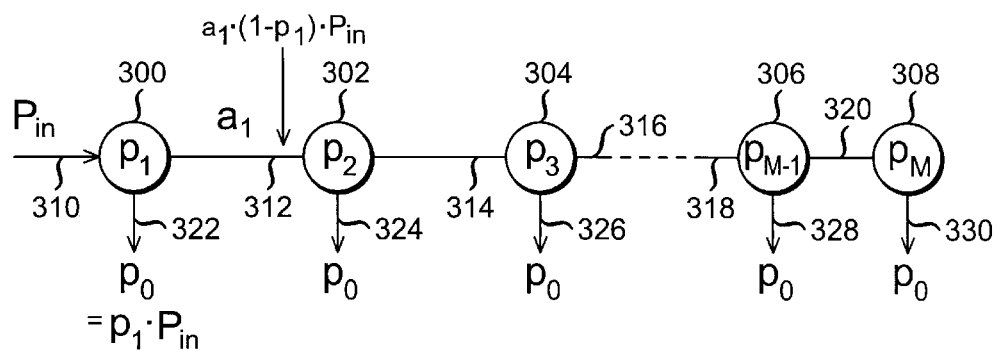
FIG. 3 illustrates a serial set of power splitters in which the general principles of the invention may be applied.

Referring to FIG. 3, there is shown a plurality of M optical power splitting centres 300 to 308 connected in a serial fashion. Although the invention is described in relation to optical power splitting centres, it is not so limited, and may be utilised in non-optical applications.

The first optical power splitting centre 300 receives an optical signal having a power level Pin on line 310. The optical power splitting centre delivers a portion of this input power on a first output line 312 to the next serially connected optical power splitting centre 324, and delivers a portion of the input power on a second output line 322. The second optical power splitting centre 302 receives the signal from the first power splitting centre 300 on line 312, the power level of which has been attenuated by a factor $a_1$ due to attenuation loss in the connection 312. The second and subsequent power splitting centres split the input power they receive in the same way as the first power splitting centre, i.e. between a first and second output. Each of the first outputs provide an input to the next optical power splitting centre in the serial connection. Each of the second outputs provide an input, for example, to a sub-network such as described hereinabove with reference to FIG. 2. Thus the power splitting centres 302, 304, and 306 each have a first output 314, 316 and 320, and a second output 324, 326, and 328. The last power splitting centre has only one output, corresponding to the second outputs of the others.

Each of the M power splitting centres has a power splitting factor $p_i$ (where i=1 ... M). The power splitting factor determines the portion of the input power delivered to the second output. In a preferable implementation, each of the second outputs are connected to a sub-network such as discussed in relation to FIG. 2.

In accordance with the present invention, the power splitting factor in each of the optical power splitting centres 300 to 308 is variable, such that the output power delivered on the second output by each splitting centre is variable. In a particularly preferred embodiment, the power splitting factors are variable such as to ensure that each power splitting centre presents an identical output power level $P_0$ on its second output.

It is advantageous to set the node optical power split factor in such a way that the optical power tapped off is equal among the nodes to enable a modular design.

A power split factor $p_i$ at each node i thus needs to be determined which yields a constant output power $P_0$ for a given input power $P_{in}$ to the bus.

$$\frac{P_0}{P_{in}} = p_1 = a_1 \cdot (1-p_1) \cdot p_2 =$$

$$a_1 \cdot (1-p_1) \cdot a_2 \cdot (1-p_2) \cdot p_3 = \ldots = p_i \cdot \prod_{k=1}^{i-1} (a_k \cdot (1-p_k))$$

where, $P_{in}$=the input power to the serial connection;

$P_0$=the output power at the second output of each power splitting centre;

$p_i$=the power splitting factor of the $i^{th}$ optical power splitting centre;

$a_i$=the excess loss of the $i^{th}$ optical power splitting centre plus the attenuation loss between the $i^{th}$ and the $(i+1)^{th}$ power splitting centres, where i =1 ... (M−1).

From this expression, it can be deduced:

$$p_i \cdot \prod_{k=1}^{i-1}(a_k \cdot (1-p_k)) =$$

$$p_i \cdot a_{i-1} \cdot (1-p_{i-1}) \cdot \prod_{k=1}^{i-2}(a_k \cdot (1-p_k)) = p_{i-1} \cdot \prod_{k=1}^{i-2}(a_k \cdot (1-p_k))$$

From this, and appreciating that the last node M in the serial connection (or bus) should tap off all the remaining power, the following recursive relation is defined:

$$p_{i-1} = 1 - \frac{1}{1+a_{i-1} \cdot p_i} \text{ with } i = 1, 2, \ldots, M \text{ and } p_M = 1$$

The preferable application of the technique of the present invention to the preferable scenario of FIG. 2 will now be discussed.

In normal operating conditions, as discussed hereinabove, the optical signals are flowing via one of the two fibre rings, e.g. via the ring formed by the first set of optical splitting centres (i.e., the outer ring, where signals from OLT to the ONUs are flowing in the clockwise direction, and the signals from the ONUs to the OLT in the opposite direction). The main power splitting centre 250 splits the optical signal between its two outputs in accordance with its power splitting factor, $p_0$. Each of the first set of optical power splitting centres has a power splitting factor of $p_k$, and each of the second set of optical power splitting centres has a respective power splitting factor of $q_{N-k+1}$, where k=1 ... N.

The optical power delivered on the output line 252 has a value of $p_0 \cdot P_{in}$, and the optical power delivered on the output line 254 has a value of $(1-p_0)P_{in}$.

The power splitting factor of the splitter 250, in this normal operation, is set to $p_0$=1. That is, all the optical power on the signal line 110 is delivered into the outer operating ring on the output line 252. Hence the optical power delivered on line 252 is $P_{in}$.

When a cable break occurs, as discussed hereinabove, at least part of the power of the signal on line 110 will be directed into the standby ring, i.e. the ring defined by the second set of power splitting centres (i.e., the inner ring, where signals from OLT to the ONUs are flowing in the counter-clockwise direction, and the signals from the ONUs to the OLT in the opposite direction). When a break occurs between the power splitting pairs 224 and 230, which comprises tap nodes k and k+1 of the first set of power splitting centres (where e.g. k=4), the tap factor $p_0$, the tap factors $p_i$ in the outer ring, and tap factors $q_i$ in the inner ring are adjusted in order to provide a constant output power $P_0$ at each tap to each sub-network. This concerns the tap couplers in the outer ring with power tap factors $p_1$ through $p_k$, and the tap couplers in the inner ring with power tap factors $q_1$ through $q_{N-k}$. Because $P_0 = c \cdot p_0 \cdot P_{in} \cdot p_1 = c \cdot (1-p_0) \cdot P_{in} \cdot q_1$, where c represents the common fibre link losses from the OLT to the first taps in the inner and outer ring, it follows that the tap factor $p_0$ in the central power splitting centre 250 needs to be set to:

$$p_0 = \frac{q_1}{p_1 + q_1}$$

The factors $p_1$ and $q_1$ follow from the recursive formula for the tap factors, by setting respectively M=k (to determine the tap factors in the first set of optical power splitting centres) and M=N−k (to determine the tap factors in the second set of optical power splitting centres).

As an example, a calculation has been made of the tap factors, or power split factors $p_i$, for a system with N=10 nodes. The results are shown in Table I. The link losses between the nodes are all assumed to be equal to 1.5 dB, assuming an attenuation loss factor between nodes ($a_i$) of 0.707946.

TABLE 1

| i | pi for N=4 | pi for N=6 | pi for N=10 |
|---|---|---|---|
| 10 | | | 1.000 |
| 9 | | | 0.415 |
| 8 | | | 0.227 |
| 7 | | | 0.138 |
| 6 | | 1.000 | 0.089 |
| 5 | | 0.415 | 0.059 |
| 4 | 1.000 | 0.227 | 0.040 |
| 3 | 0.415 | 0.138 | 0.028 |
| 2 | 0.227 | 0.089 | 0.019 |
| 1 | 0.138 | 0.059 | 0.013 |

When there is no cable break, the taps in the outer ring are set according to the values in the column with N=10, and the splitter $p_0$ is set to $p_0$=1. The tapped power at each node is $c \cdot P_{in} \cdot p_1 \cdot p_0 = c \cdot P_{in} \cdot 0.013$.

When a break occurs after the fourth node for example, the outer ring has its tap factors set according to the values in the column with N=4, and the inner ring according to the one with N=6. The splitter $p_0$ is set to $p_0$=0.300379. The tapped power at each node (in the inner ring as well as in the outer ring) is again constant and given by $c \cdot P_{in} \cdot p_1 \cdot p_0 = c \cdot P_{in} \cdot 0.041568$.

Figure 4:
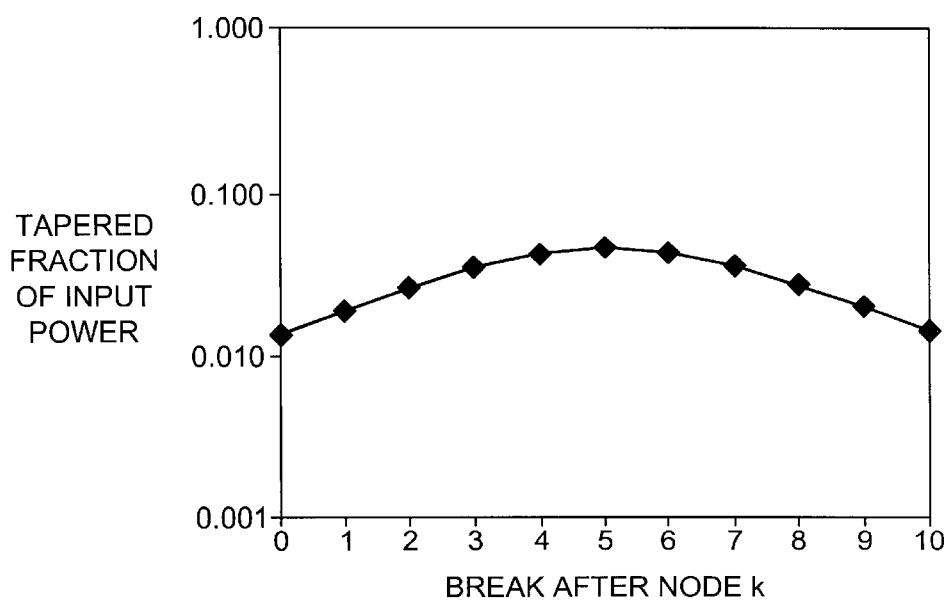
FIG. 4 illustrates the resulting tapped fractions of the input power when a cable break occurs in the double fibre ring architecture, using the power splitting technique according to the principles of the invention.

In case of a cable break after node k, the constant tapped power at each node depends on k as shown in FIG. 4. FIG. 4 illustrates the dependence of the tapped fraction of the input power $P_{in}$ (y axis) as a function of the position of the cable break (x axis), when using a power splitting technique according to the present invention.

Figure 5:
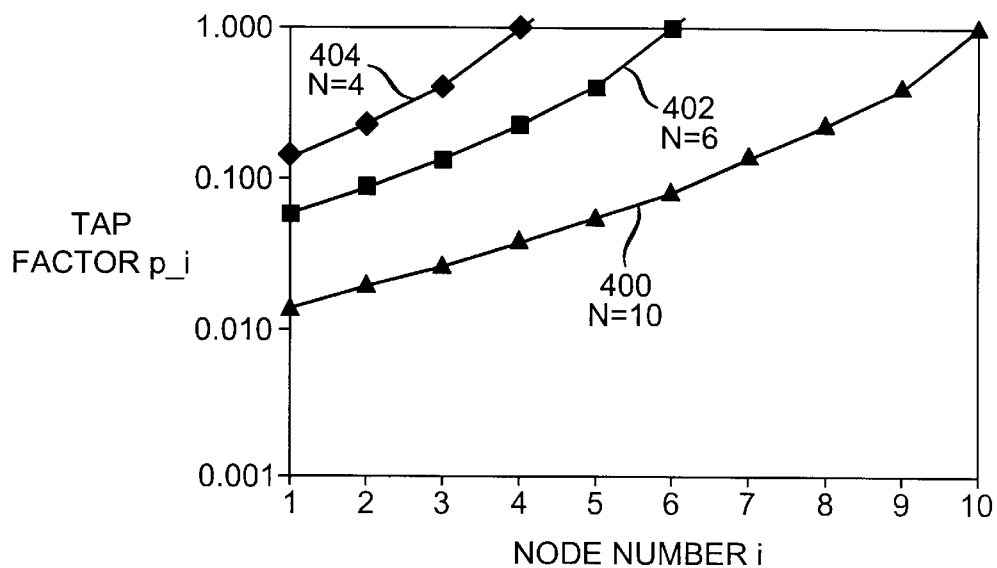
FIG. 5 illustrates the tap factor per power splitter, in a serial set of N power splitters according to FIG. 3.

The results as illustrated in Table I are plotted in a graph in FIG. 5. FIG. 5 illustrates a plot of the tap factor $p_i$ (on the y-axis) against the node number i (on the x-axis). The curve 400 represents the plot of the results of Table I for N=10, the curve 402 represents the plot of the results of Table I for N=6, and the curve 404 represents the plot of the results of Table I for N=4.

Figure 6:
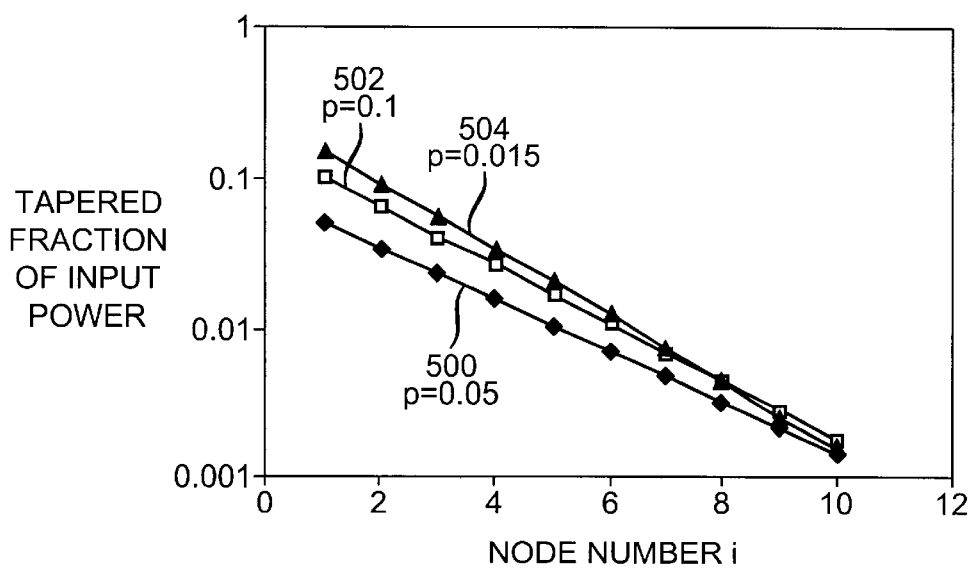
FIG. 6 illustrates the results achieved using a conventional power splitting technique.

For comparison, in FIG. 6 the results are plotted for a linear bus with constant power tap fraction p. Again, it is assumed that the fibre link losses between the nodes are 1.5 dB. Curve 500 shows the results for a constant power split factor of 0.05, curve 502 shows the results for a constant power split factor of 0.15, and curve 504 shows the results for a constant power split factor of 0.1. In a N=10 node system there is a variation of some 20 dB between the tapped powers per node, whereas in the proposed variable tap coupler architecture the variation is none.

In case of a cable break after node k in the proposed variable tap coupler architecture, the tapped power per node is still constant, but depends on k as is shown in FIG. 4. For N=10 the tapped power varies less than 5.3 dB, which is much less than would happen in a system with nodes having a constant power tap fraction p.

Figure 7:
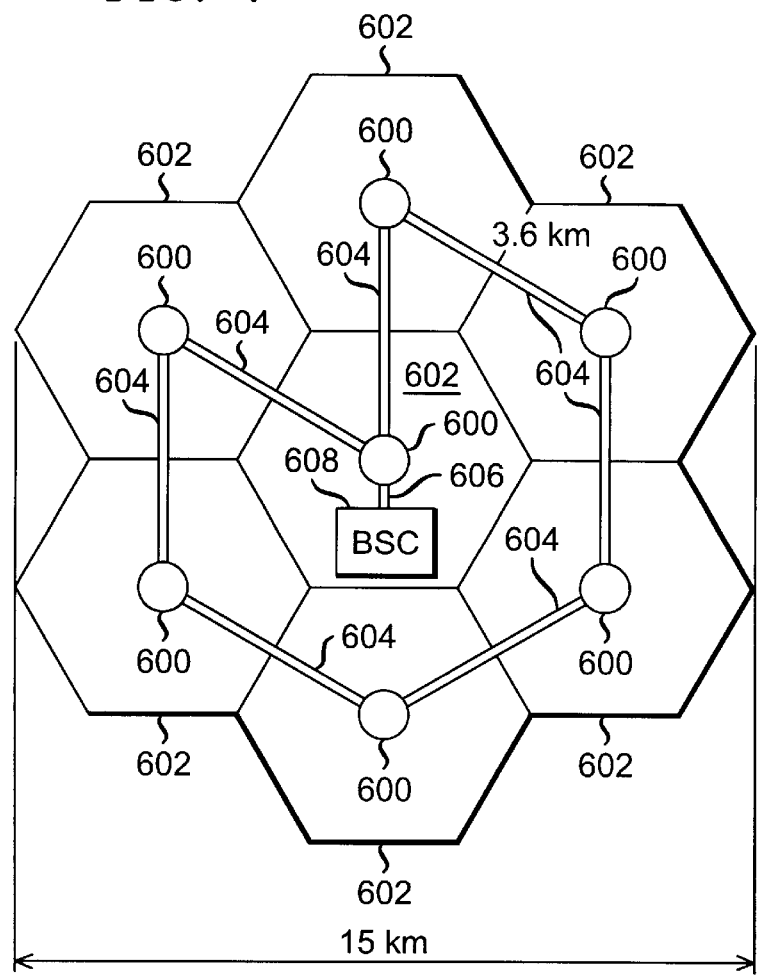
FIG. 7 illustrates a system architecture such as adopted in the PRISMA project in which the principles of the invention may be implemented.

The results of the implementation of the present invention in a PRISMA implementation are discussed hereinafter. FIG. 7 illustrates an example of a PRISMA environment. A nested hexagonal cell structure of the PRISMA coverage area is assumed.

Seven cells 602 each have a node 600, feeding a sub-network of base stations, of a double fibre ring architecture. The double fibre ring architecture is fed by a base station controller 608 via an optical connection 606 to the node 600 of a central cell. Thus the connection of the double fibre ring architecture of FIG. 7 is similar to that of FIG. 2.

As shown in FIG. 7, a typical diameter of the total area hosting $7^4$=2401 base stations each covering a cell of 50 m radius is 15 km. Laying a double fibre ring to connect the central nodes in each macro-cell yields fibre link lengths of 3.6 km between the nodes. Accounting for 0.5 dB/km installed-fibre loss at $\lambda$=1.54 $\mu$m, this makes $\alpha_i$=0.661 for all i. Thus the power split factors $p_i$ per node for a system with 7 nodes can be calculated as listed in Table II below; $\alpha$=1 if the link losses are negligible, and $\alpha$=0.330 for a link length of 9.6 km. For $\alpha$=0.661, the split factors vary between 3% for the first node and 100% for the last node; for increasing link losses the range of variation grows considerably.

TABLE II

| | $\alpha$ | | |
|---|---|---|---|
| i | 1 | 0.661 | 0.330 |
| 7 | 1.00 | 1.000 | 1.00E+00 |
| 6 | 0.50 | 0.398 | 2.48E−01 |
| 5 | 0.33 | 0.208 | 7.58E−02 |
| 4 | 0.25 | 0.121 | 2.44E−02 |
| 3 | 0.20 | 0.074 | 8.01E−03 |
| 2 | 0.17 | 0.047 | 2.64E−03 |
| 1 | 0.14 | 0.030 | 8.71E−04 |

Although the present invention has been described with particular reference to a double fibre ring architecture, it is not so limited. The invention is also not limited to networks using optical power splitters. The principle of the invention may be applied in any power splitter. Although in the described preferred embodiment the variable power control in a power splitter is utilised to ensure a uniform output power at each power splitter node, the variable power splitting factor may be used to allow the output power at each node to differ. This will be particularly advantageous where the size of the sub-networks supported by different nodes varies, and thus the power supplied to those sub-networks can be varied to deal with the varied load.

Figure 8:
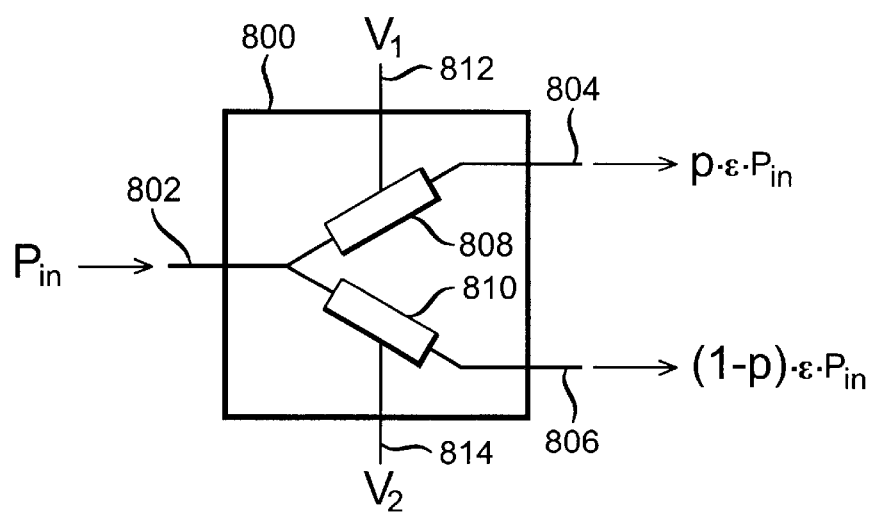
FIG. 8 shows a possible implementation of the variable power splitter.

The variable power splitter can be realised with well-known techniques. FIG. 8 illustrates one possible implementation of the variable power splitter for an optical application such as the double fibre ring architecture of FIG. 2.

FIG. 8 shows a digital optical switch (DOS) 800, which guides a certain fraction of the input power $P_{in}$ on an input port 802 to each of two output ports 804 and 806. The DOS 800 contains two electrodes 808 and 810 which respectively deliver a portion of the optical power on input port 802 to the output ports 804 and 806. The electrodes 808 and 810 are controlled by a respective applied voltage V1 and V2 on control lines 812 and 814. The fractions p and (1−p) of the input power $P_{in}$ delivered to the two output ports 804 and 806 by the electrodes 808 and 810 are dependent on the applied voltages $V_1$ and $V_2$. The DOS has an inherent excess loss factor $\epsilon$, which affects the output of the power on the two output ports. The output power on port 804 is thus p.$\epsilon$.Pin, and the output power on port 806 is (1−p).$\epsilon$.Pin.

Other ways of implementing the power splitter for an optical implementation will be apparent to one skilled in the art. For example, a Mach Zehnder Interferometer structure may alternatively be used.

As has been discussed hereinabove, the application of the invention is not limited to a double fibre-ring architecture such as shown in FIG. 2. The invention may be utilised in any environment in which power splitters are serially connected and commonly fed as shown in FIG. 3.

One alternative implementation of the protection scheme is in a single fibre ring, operated bi-directionally, which can be realised using variable optical power splitters controlled in accordance with the present invention. Such a scheme effectively differs from the double fibre ring architecture shown in FIG. 2 in that only one ring is provided, for example the outer ring, and instead ending in the termination point 258 the last power splitting centre has its first output connected to the central power splitting centre 250.

In such an arrangement the power splitting centres 202, 208, 214, 220, 228, 234, and 240 need to operate on light coming from both directions (clockwise and counter-clockwise). These power splitting centres may still be implemented in a conventional manner, utilising the digital optical switches as discussed hereinabove.

In comparison with the double fibre ring architecture, however, the single fibre set-up is more vulnerable to optical reflections, and thus demands higher reflection attenuation factors of the optical fibre joints (such as connectors and splices).

Various other architectures in which the present invention may be utilised will be apparent to one skilled in the art.

What is claimed is:

1. A network architecture comprising a first set of N serially connected power splitting centres connected at one end to receive a power signal and at another end to a termination point, each splitting centre having an output associated with a sub-network for delivering a portion of the power signal to that sub-network, wherein the power splitting factor in each power splitting centre is variable such that the portion of the power signal delivered to each sub-network is variable, wherein the power splitting factor in each power splitting centre is such that the portion of the power signal delivered to each sub-network is identical, and wherein the power splitting factor in each power splitting centre follows the recursive relation:

$$p_{i-1} = 1 - \frac{1}{1 + a_{i-1} \cdot p_i}$$

where $p_{i-1}$ is the power splitting factor in the i−1$^{th}$ power splitting centre, and $a_{i-1}$ is the attenuation loss between the i$^{th}$ and the i−1$^{th}$ power splitting centres.

2. The network architecture of claim 1 wherein each power splitting centre is an optical power splitting centre.

3. The network architecture of claim 1 comprising a passive optical network.

4. The network architecture of claim 1 wherein the network comprises a feeder network for a wireless communication system.

5. A network architecture comprising:
   a first set of N serially connected power splitting centres connected at one end to receive a power signal and at another end to a termination point, each splitting centre having an output associated with a sub-network for delivering a portion of the power signal to that sub-network, wherein the power splitting factor in each power splitting centre is variable such that the portion of the power signal delivered to each sub-network is variable; and
   a second set of N serially connected power splitting centres connected at one end to receive the power signal and at another end to a termination point, each of the second set of optical splitting centres being associated with one of the first set of optical splitting centres such that the nth power splitting centres of the first set is associated with the $(N-n+1)^{th}$ of the second set, and such that each pair of power splitting centres have a respective output connected to a common sub-network; wherein only one of each pair of power splitting centres receives the power signal.

6. The network architecture of claim 5 wherein the power splitting factor in each power splitting centre of the second set is such that the portion of the power signal delivered to each sub-network is identical.

7. The network architecture of claim 6 wherein the power splitting factor in each power splitting centre of the second set follows the recursive relation:

$$q_{i-1} = 1 - \frac{1}{1 + a_{i-1} \cdot q_i}$$

where $q_{i-1}$ is the power splitting factor in the $i-1^{th}$ power splitting centre of the second set, and $a_{i-1}$ is the attenuation loss between the $i^{th}$ and the $i-1^{th}$ power splitting centres of the second set.

8. The network architecture of claim 5 further comprising a central power splitting centre for delivering the power signal to the first and second sets of power splitting centres, the central power splitting centre having an input for receiving the power signal, a first output for delivering the power signal to the first set, and a second output for delivering the power signal to the second set, wherein the central power splitting centre has a variable power splitting factor.

9. The network architecture of claim 8 wherein in normal operation the variable power splitting factor in the central power splitting centre is set such that the power signal is all delivered to the first output.

10. The network architecture of claim 8 wherein in the event of a failure in the serial link of the first set of power splitting centres, the variable power splitting factor in the central power splitting centre is set such that a portion of the power signal is delivered to both the first and second outputs.

11. The network architecture of claim 10 wherein if the serial connection is lost between the kth and k+1th power splitting centres of the first set, the first k of the power splitting centres of the first set receive a portion of the power signal, and the first N−k of the power splitting centres of the second set receive a portion of the power splitting centre.

12. The network architecture of claim 10 wherein the power splitting factor in the central power splitting centre is $$\frac{q_1}{p_1 + q_1},$$

where $p_1$ is the power splitting factor in the first power splitting centre of the first set, and $q_1$ is the power splitting factor in the first power splitting centre of the second set.

13. The network architecture of claim 12 wherein the power splitting factor in each active power splitting centre of the first and second sets is set such that the power level delivered to each sub-network is the same.

14. The network architecture of claim 5 wherein the network architecture comprises a double fibre ring architecture, the first set of power splitting centres comprising a first fibre ring and the second set of power splitting centres providing a second fibre ring.

* * * * *